Figure 30:
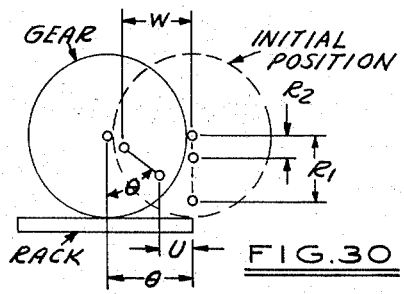

United States Patent [19]

Brems

[11] 3,777,580
[45] Dec. 11, 1973

[54] MOTION AND FORCE TRANSFORMING MECHANISM

[76] Inventor: John Henry Brems, 32867 White Oaks Trail, Birmingham, Mich.

[22] Filed: Sept. 30, 1971

[21] Appl. No.: 185,273

[52] U.S. Cl............................ 74/110, 74/29, 74/422
[51] Int. Cl............................................. F16h 21/44
[58] Field of Search...................... 74/110, 29, 422

[56] References Cited
UNITED STATES PATENTS

| 444,016 | 1/1891 | Puetz, Jr. | 74/110 |
|---|---|---|---|
| 1,751,646 | 3/1930 | Nieman | 74/110 |
| 2,047,061 | 7/1936 | Edwards | 74/110 |
| 455,248 | 6/1891 | Fennell | 74/110 |
| 2,047,061 | 7/1936 | Edwards | 74/110 |
| 2,440,457 | 4/1948 | Beckwith | 74/110 |

Primary Examiner—Charles J. Myhre
Assistant Examiner—Wesley S. Ratliff, Jr.
Attorney—Barnes et al.

[57] ABSTRACT

A self-contained motion and force transmitting mechanism which includes a housing having a straight line input member and a straight line output member with included mechanism to translate a constant velocity input to a desired acceleration and deceleration output with a desired constant velocity interposed between the ends of the stroke.

13 Claims, 48 Drawing Figures

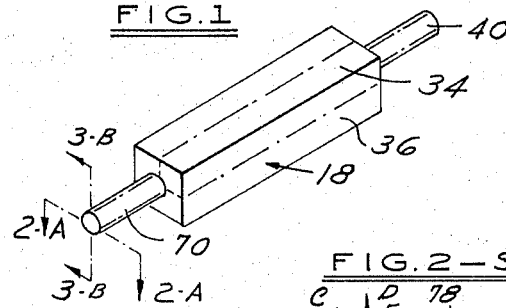
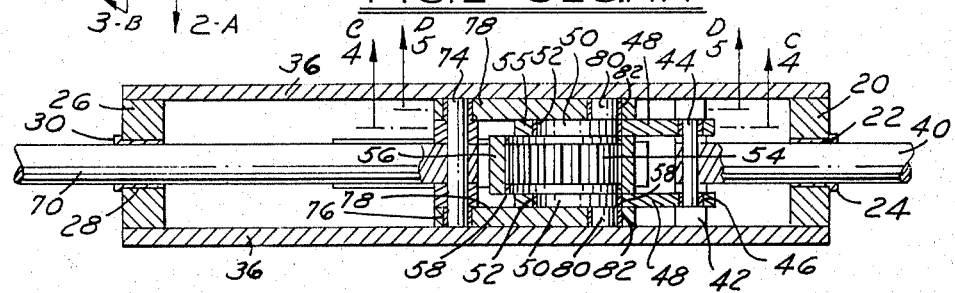
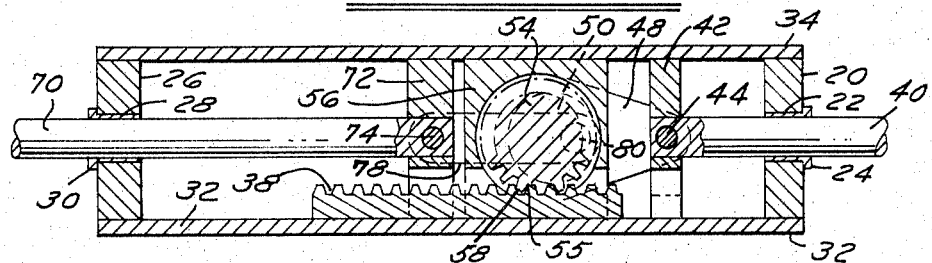
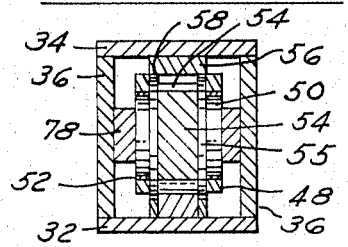
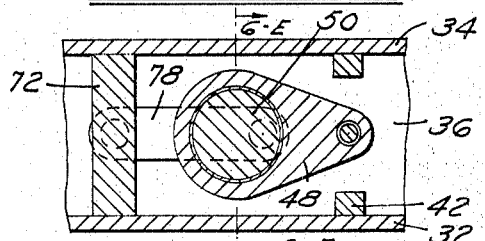
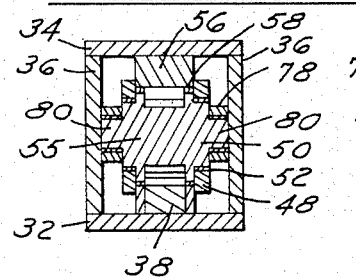
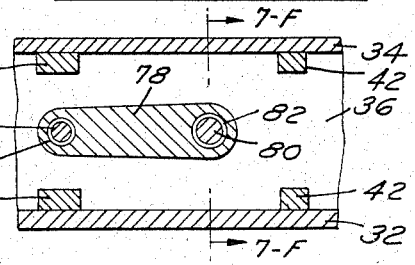

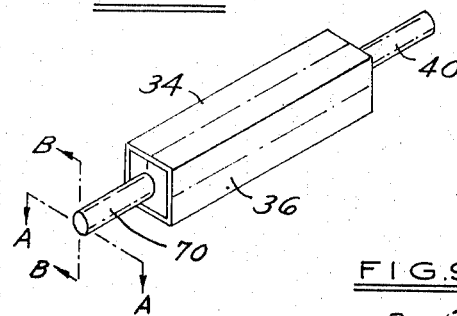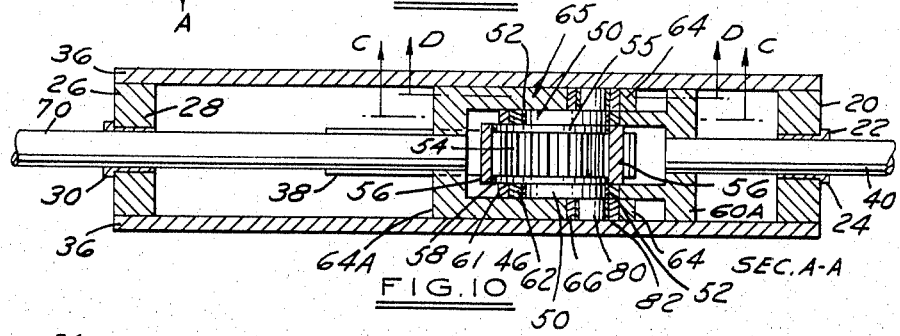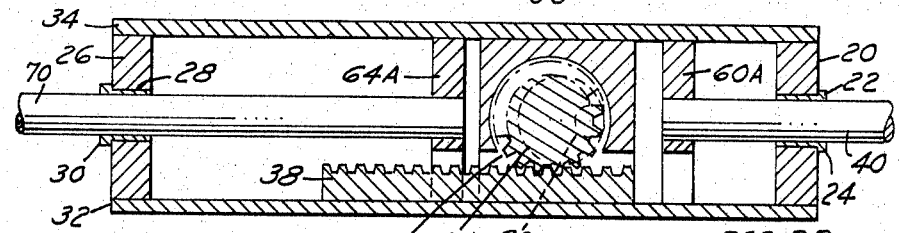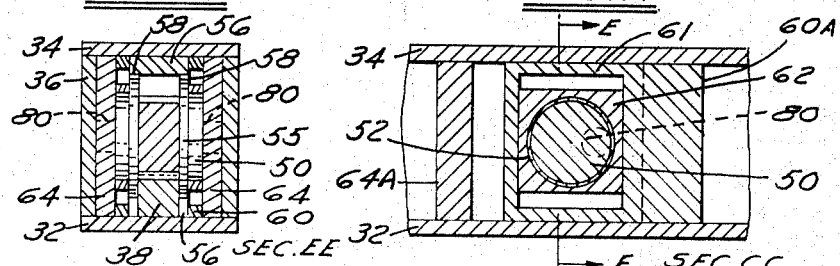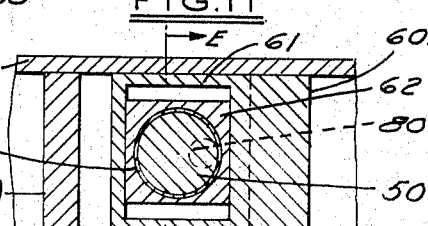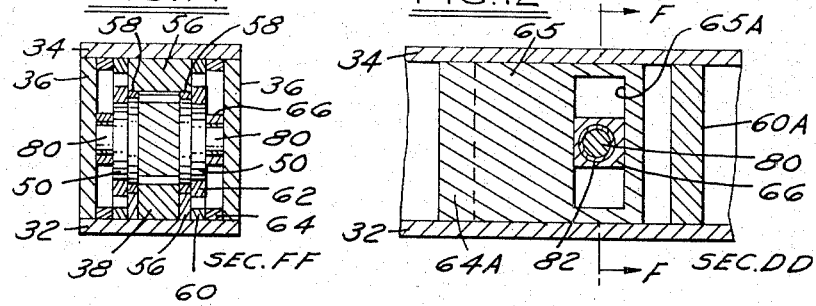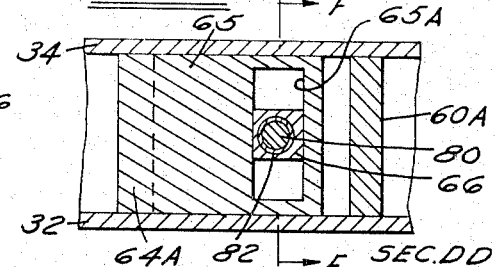

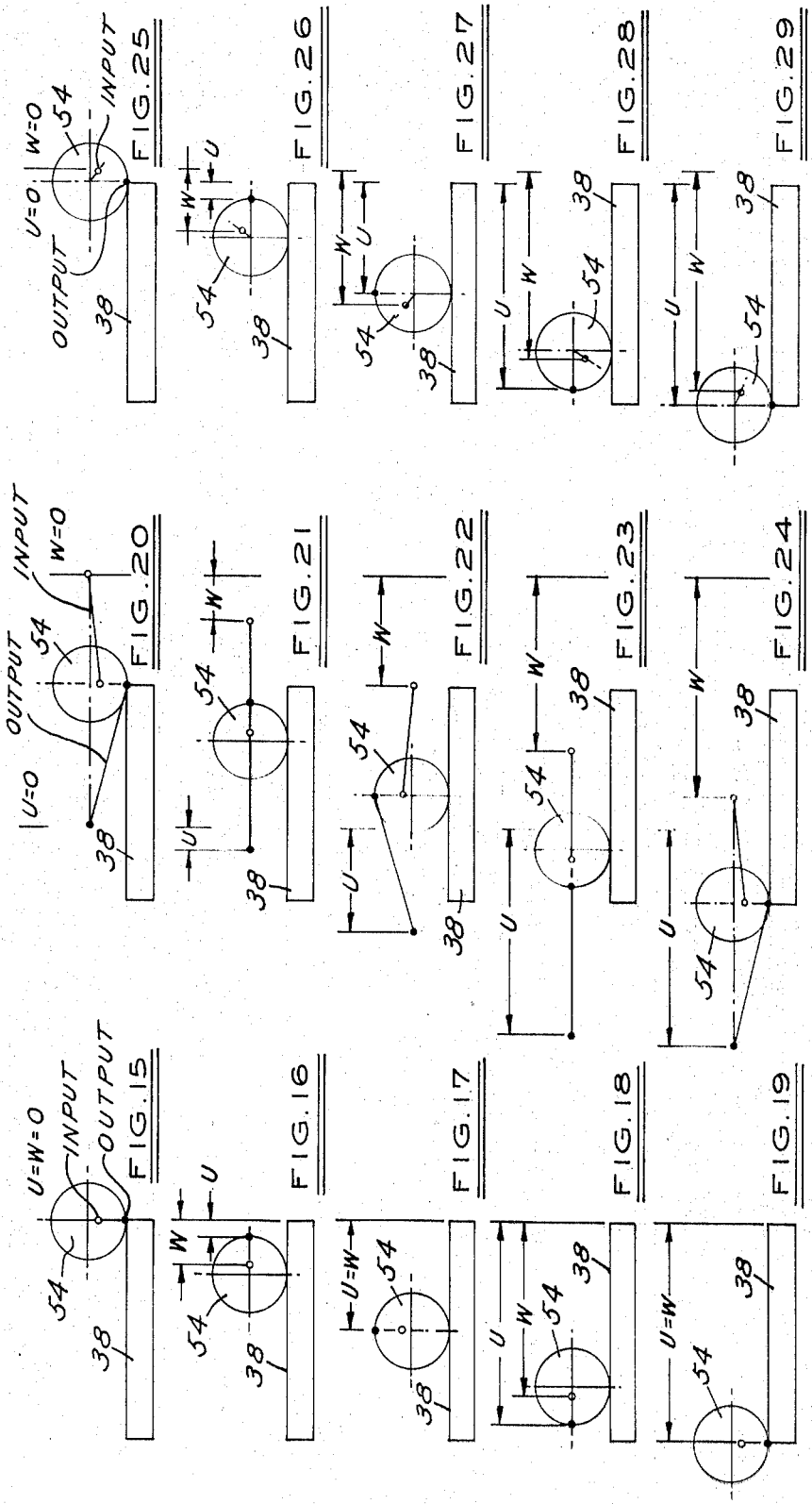

MOTION AND FORCE TRANSFORMING MECHANISM

This invention relates to a self-contained package type motion and force transforming mechanism.

It is an object of this invention to provide a packaged mechanism having an input member which is moved by external means in an essentially straight line, an output member which also moves in an essentially straight line, and a support housing or case which guides both members and transmits any reaction loads to its supports; the coupling between the input and output members so arranged that the output member accelerates and decelerates through its stroke when the input member is moved at a nominally constant velocity.

It is another object to provide a mechanical package system as described above in which the output member is automatically locked relative to the case at each end of its stroke.

It is a further object to provide a system in which the input member has a large mechanical advantage over the output member near the beginning and end of the stroke and having a smaller disadvantage near the center of the stroke. These can be adjusted by suitable design parameters.

It is a further object to provide a system in which the input member can overtravel a nominal amount at each end of its stroke while creating a negligibly small movement of the output member.

It is a further object to provide a system in which the kinematic relationships between the input and output members during the stroke can be modified over a considerable range through the choice of design parameters.

It is a further object to provide a mechanical package which can be appended to and made integral with a cylinder, either air or hydraulic, thereby transforming the cylinder's essentially constant velocity piston movement to a linear movement having smooth acceleration and deceleration characteristics at the beginning and end of the stroke.

It is a further object to provide a system in which, for some applications, the aforesaid piston is a component of the mechanism.

It is a further object to provide a more general and highly flexible system having three externally connected members as follows: an input member, externally driven; a reaction member, externally supported; and an output member, whose kinematic and dynamic characteristics can be modified over an extremely wide range by adjustment of several internal geometric parameters, thereby meeting objectives other than those described above, among which, by way of example, are:

1. A short and high acceleration of the output member followed by a lengthy and small deceleration;
2. A lengthy and small acceleration followed by a short and high deceleration;
3. A substantial force multiplication of the output relative to the input at either or both ends of the stroke or at some desired area in between;
4. A nominally constant velocity of the output member over a major fraction of the stroke, while still maintaining a smooth acceleration and deceleration at each end of the stroke.

In the general field of special machine and automation construction, the use of air and hydraulic cylinders is widespread. While in some cases the masses which these cylinders move is relatively small, in many cases the masses to be moved are large and various devices are employed to prevent excessive shocks at the ends of the cylinder strokes. Such devices include flow control valves, mechanically operated deceleration valves, and independent shock absorbers. These devices, when properly adjusted or tuned, can perform a creditable job. However, the difficulty of maintaining the proper tuning under conditions of rigorous use and the relative complexity of their installation has motivated the search for a simple foolproof mechanical system to accomplish these same and additional functions.

When the scope of the application is such that even these types of devices are inadequate, the machine designer employs specially designed mechanisms such as cranks, toggle linkages, or cams to impart the desired acceleration characteristics to the masses to be moved. Additionally, many applications arise in which locking of the output at the ends of the stroke is desired, and this requires not only additional mechanism, but also additional control functions.

The package mechanism described herein, in one of its versions, can be applied in all of these situations, and will result in better and more predictable performance at lesser expense. The device may be used as a stroke converter, for welding machines, piercing devices, press feeders, shock absorbers and internal snubbers and numerous other applications.

Other applications arise in which a designer seeks a given kinematic or force characteristic for a particular motion to meet his particular need. Designing and developing a linkage or other mechanical system to meet these requirements can be expensive and time consuming. The package mechanism, through the judicious choice of the governing parameters can cover an extremely wide range of kinematic and force characteristics.

One example might be an application in which a given movement requires relatively little force over the first nine-tenths of its stroke, but requires a great deal of force to complete the remaining one-tenth of its stroke. Another example might be an application in which it is required to convert an essentially constant velocity into an approximate sawtooth velocity, i.e., a velocity which builds up slowly at an approximate constant rate, then abruptly decreases to zero. A third example might be an application in which it is desired to accomplish a movement with a short steep acceleration at the beginning of the stroke, a relatively low acceleration and deceleration during the middle range of the stroke, and finally a short steep deceleration at the end of the stroke, with the added condition that the acceration start from zero. These and many more functions can be accomplished with the device described herein.

Other objects and features of the invention relating to details of construction and operation will be apparent in the following description and claims in which are disclosed the principles and use of the invention together with the best mode presently contemplated for practice of the invention.

DRAWINGS accompany the disclosure and the various views thereof may be briefly described as follows:

FIGS. 1 to 7, an isometric external assembly view of the device and six relevant sections A—A, B—B, C—C, D—D, E—E, F—F of a link mode style mechanism.

FIGS. 8 to 14, an isometric assembly view of a modified device and six relevant sections A—A, B—B, C—C, D—D, E—E, F—F through a slide mode style mechanism.

FIGS. 15 to 19, five sequential movement schematic drawings for a slide mode in-phase system.

FIGS. 20 to 24, five sequential movement schematic drawings for a link mode in-phase system.

FIGS. 25 to 29, five sequential movement schematic drawings for a slide mode-out-of-phase system.

FIG. 30, a kinematic line drawing for a slide mode, straight rack, in-phase system.

Figure 31:
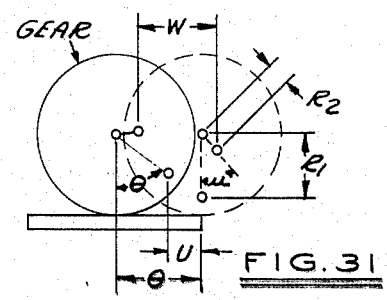

FIG. 31, a kinematic line drawing for a slide mode, straight rack, out-of-phase system.

Figure 32:
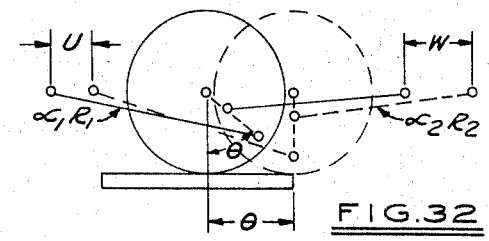

FIG. 32, a kinematic line drawing for a link mode, straight rack, in-phase system.

Figure 33:
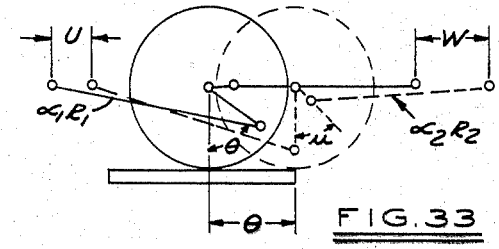

FIG. 33, a kinematic line drawing for a link mode, straight rack, out-of-phase system.

Figure 34:
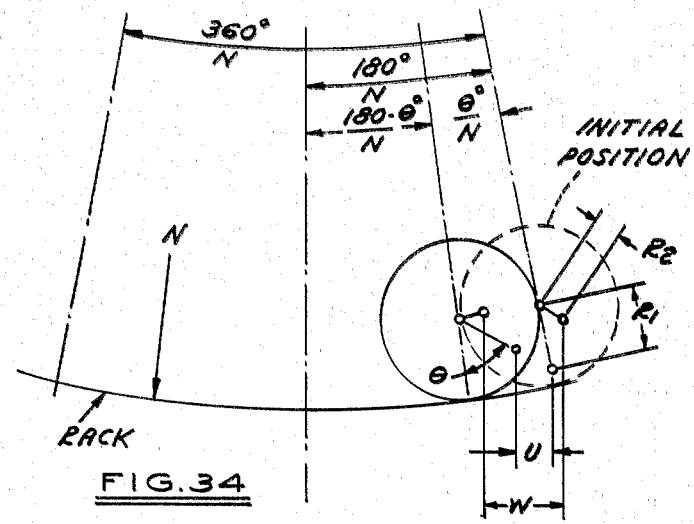

FIG. 34, a kinematic line drawing for a slide mode, curved rack, out-of-phase system.

Figure 35:
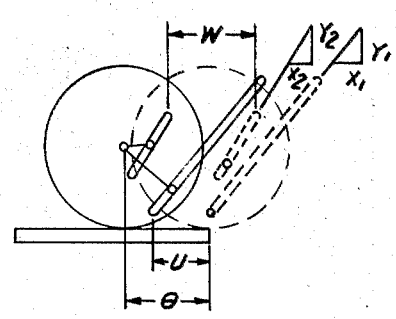

FIG. 35, a kinematic line drawing for an inclined slide, straight rack, out-of-phase system.

Figure 36:
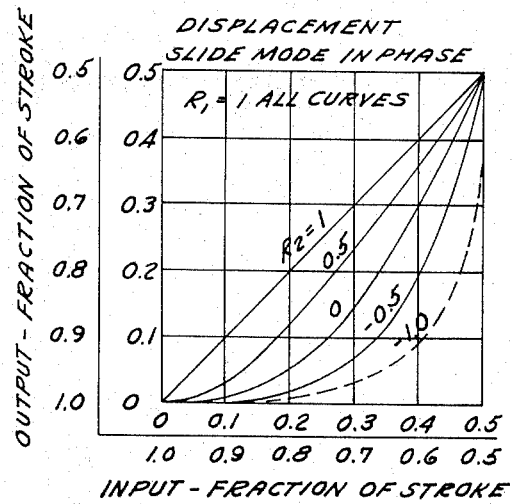

FIG. 36, a set of illustrative characteristic curves which relate output displacement to input displacement for a slide mode, straight rack, in-phase system.

Figure 37:
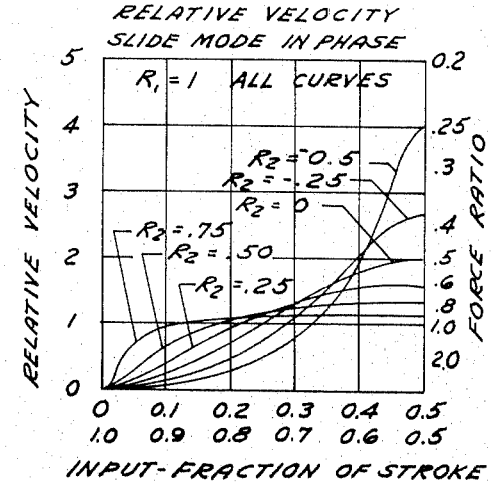

FIG. 37, a set of illustrative characteristic curves which relate output relative velocity to input displacement for a slide mode, straight rack, in-phase system.

Figure 38:
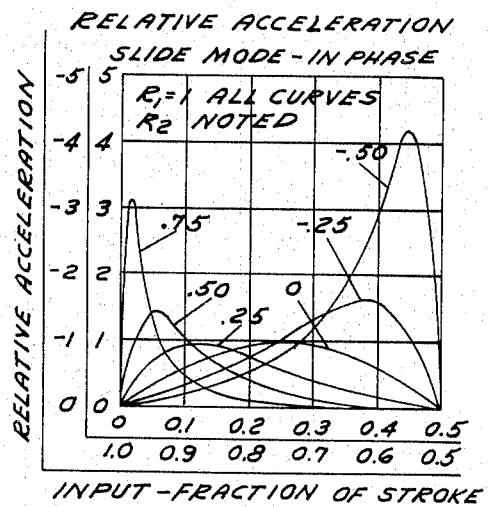

FIG. 38, a set of illustrative characteristic curves which relate output relative acceleration to input displacement for a slide mode, straight rack in-phase system.

Figure 39:
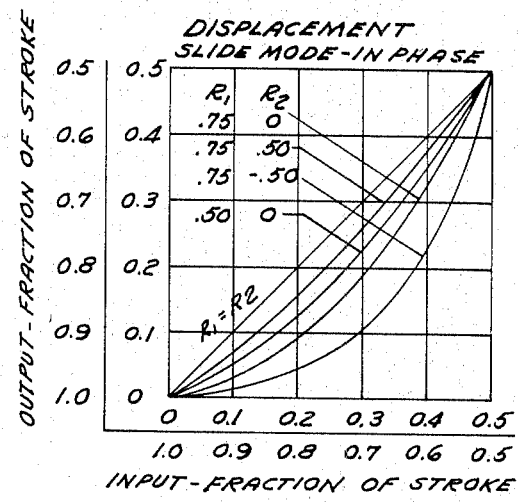

FIG. 39, another set of curves as in FIG. 36 but with different output parameters $R_1$.

Figure 40:
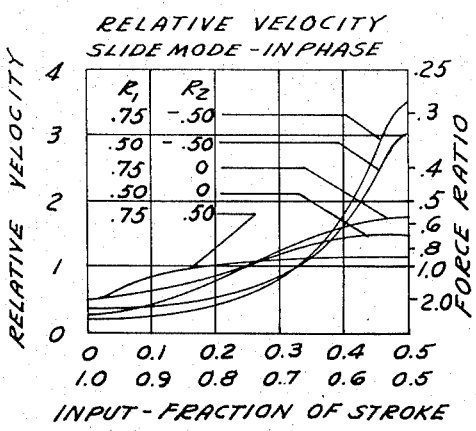

FIG. 40, another set of curves as in FIG. 37 but with different output parameters $R_1$.

Figure 41:
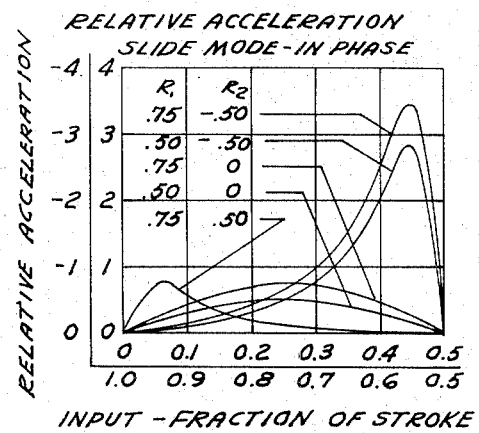

FIG. 41, another set of curves as in FIG. 38 but with different output parameters $R_1$.

Figure 42:
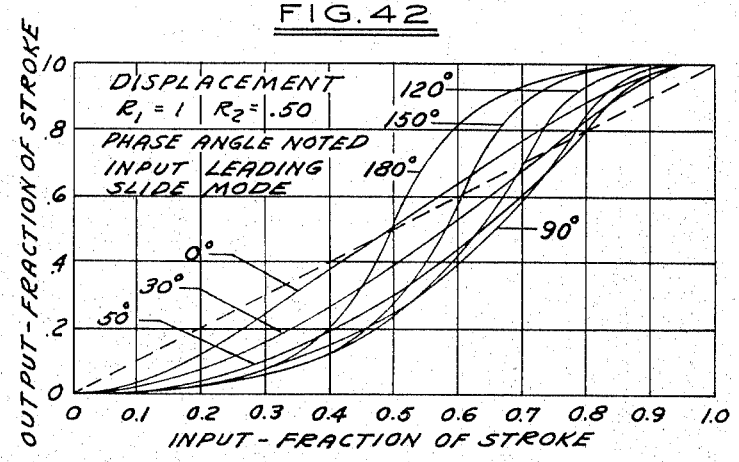

FIG. 42, a set of illustrative characteristic curves which relate output displacement to input displacement for a slide mode, straight rack, out-of-phase system.

Figure 43:
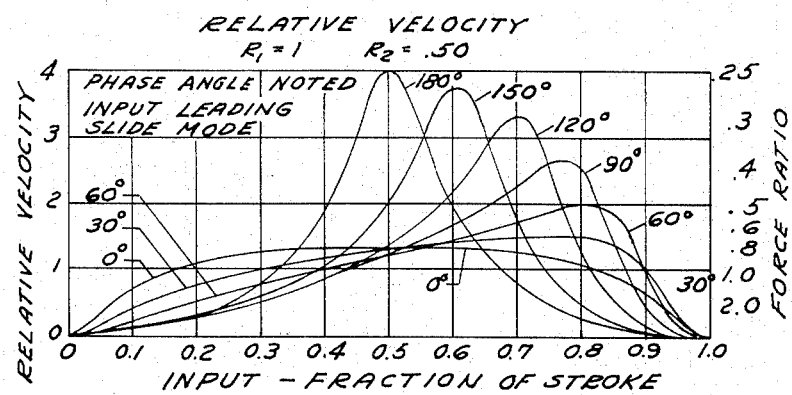

FIG. 43, a set of illustrative characteristic curves which relate output relative velocity to input displacement for a slide mode, straight rack, out-of-phase system.

Figure 44:
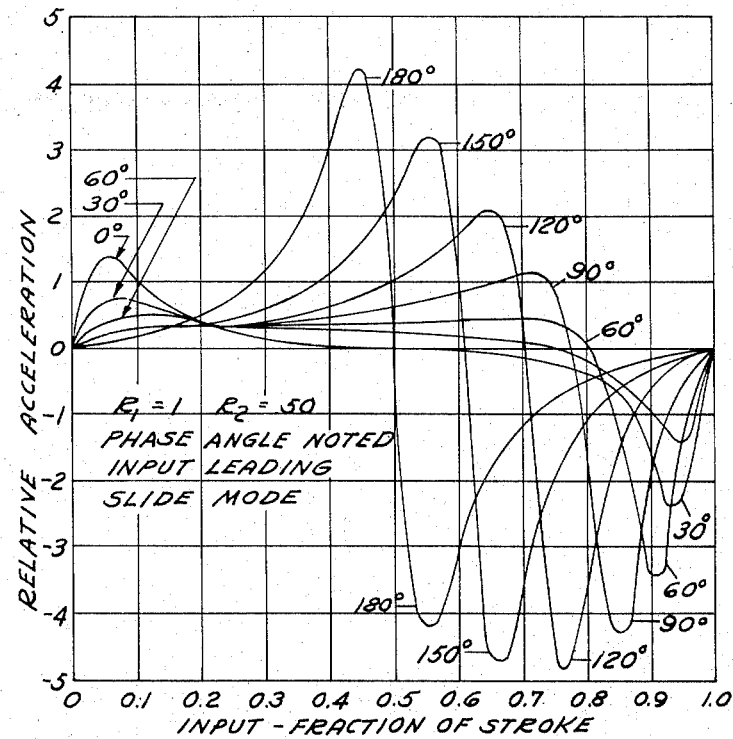

FIG. 44, a set of illustrative characteristic curves which relate output relative acceleration to input displacement for a slide mode, straight rack, out-of-phase system.

Figure 45:
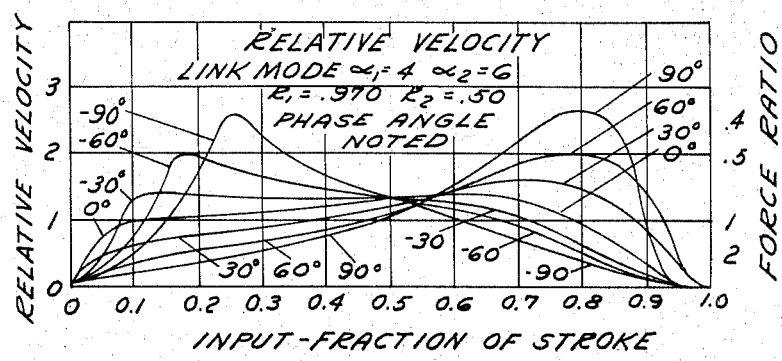

FIG. 45, a set of illustrative characteristic curves which relate output relative velocity to input displacement for a link mode, straight rack, out-of-phase and in-phase system.

Figure 46:
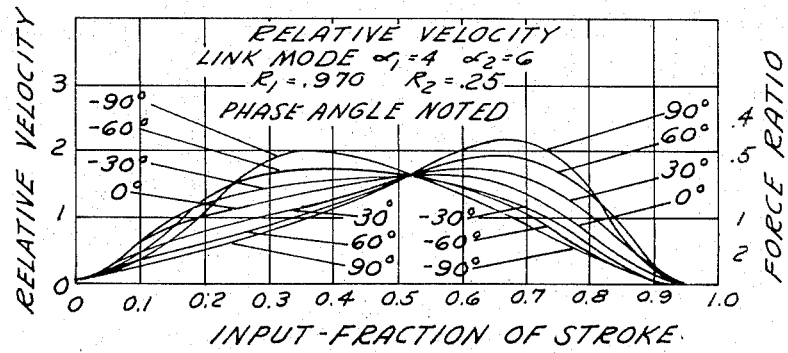

FIG. 46, another set of curves as in FIG. 45, but with a different value of input parameter $R_2$.

Figure 47:
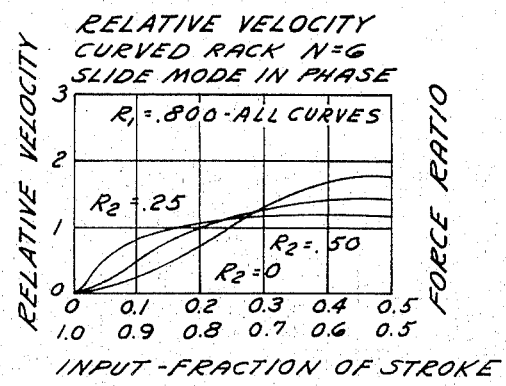

FIG. 47, a set of illustrative characteristic curves which relate output relative velocity to input displacement for a slide mode, curved rack in-phase system.

Figure 48:
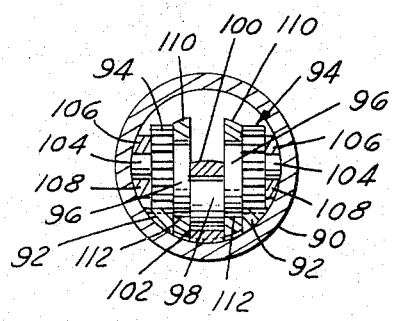

FIG. 48, a section drawing comparable to FIGS. 6 and 13 showing the construction of the mechanism with a cylindrical rather than rectangular section case or housing.

The device may be built in a variety of mechanical arrangements, the most important of which are shown and described in detail.

Referring to FIGS. 1 through 7 which apply to the straight rack link mode:

The basic frame which comprises the case or housing 18 of the mechanical assembly consists of seven members: an input end plate 20, an output end plate 26, a lower case plate 32, an upper case plate 34, two side case plates 36, and a rack 38 mounted on the longitudinal centerline of case plate 32, FIG. 3. The four case plates are each bolted to the input plate 20 and the output plate 26. In addition, adjacent case plates are bolted to each other to form a rigid box housing suitable for accepting and transmitting the internal loads to an external mounting surface.

An input rod 40 extends through the input head 20 and is supported therein through bushing 22. A seal 24 is provided to keep lubricants in and dirt out. This input rod is further guided by crosshead 42, which in turn is guided by the upper case plate 34, the lower case plate 32, and the two side case plates 36. A pin 44 extends through the crosshead 42 and connects two coupler links 48 thereto through bearings 46.

The other ends of the coupler links 48 are connected to eccentrics 50 through bearings 52. The eccentrics 50 are rigidly bolted to or integral with gear 54. The eccentricity of the eccentrics 50 from the true centerline of the gear 54 may be varied from 0 (concentric) to slightly more than the pitch radius of the gear, as one of the parameters which controls the force and kinematic characteristics of the system.

An output rod 70 extends through the output head plate 26 and is supported therein through bearings 28. A seal 30 is again provided to keep the lubricants in and the dirt out. This output rod is further guided by crosshead 72, which in turn is guided by the upper case plate 34, the lower case plate 32, and the two side case plates 36. A pin 74 extends through the crosshead 72 and connects one end of two connector links 78 thereto through bearings 76.

The other ends of the connector links 78 are connected to eccentrics 80 through bearings 82. The eccentrics 80 are rigidly bolted to or integral with the adjacent eccentrics 50. The eccentricity of the output eccentrics 80 may be varied from the true centerline of a drive wheel in the form of a gear 54 to slightly more than the pitch radius of the gear as another of the parameters which control the force and kinematic characteristics of the system. In the drawings shown, the centerlines of the eccentrics 50 and 80 are shown as lying on the same radial line drawn from the gear 54 center. This need not be the case and the angular phasing between the gear 54 radial line which contains the center of the input eccentrics 50, and the gear 54 radial line which contains the center of the output eccentrics 80, is the third major parameter which controls the force and kinematic characteristics.

A rack 38 is rigidly bolted to the lower case plate 32 and is suitably formed and located to mesh with the gear 54. The gear teeth are conventional and not shown. This rack 38 will generally but not necessarily be slightly longer than one pitch circumference of the gear 54. The gear 54 is provided with shoulders 55 which operate in bearings 58 mounted in guide block 56. This guide block 56 in turn is also guided between the lower case plate 32 and the upper case plate 34, and maintains the pitch line of the gear 54 on the pitch line of the rack 38 during the rolling of the gear 54 along the rack 38.

This mechanism is defined to be operating in the link mode because the centers of the eccentrics are link connected to their respective crossheads by pivot connected links. The slide mode mechanism is described below.

The basic frame which comprises the housing of the mechanical assembly consists of seven members: an input end plate 20, an output end plate 26, a lower case plate 32, an upper case plate 34, two side case plates 36 and the bottom rack 38 on lower case plate 32. The four case plates are each bolted to the input head 20 and the output head 26. In addition, adjacent case plates are bolted to each other to form a rigid box housing suitable for accepting and transmitting the internal loads to an external mounting surface.

An input rod 40 extends through the input head 20 and is supported therein through bushing 22. A seal 24 is provided to keep lubricants in and dirt out. This input rod 40 is further guided by crosshead 60A which in turn is guided by the case plates 32, 34 and 36. The input crosshead 60A has two spaced extension plates 61 provided with rectangular openings which carry two slide blocks 62 with circular openings to house the input eccentric bearings 52. The slide blocks 62 are slidably mounted in the openings in the extension plates 61 of the crosshead 60A; these openings or slide slots are shown with slide axes perpendicular to the axis of the input rod 40, but these slots may be inclined or even curved to achieve greater versatility. The input eccentric bearings 52 drive the input eccentrics 50 which are rigidly bolted to or integral with gear 54. The eccentricity of the eccentrics 50 from the true centerline of the gear 54 may be varied from 0 to slightly more than the pitch radius of the gear, as one of the parameters which controls the force and kinematic characteristics of the system.

An output rod 70 extends through the output end plate 26 and is supported therein through bushing 28. A seal 30 is provided to keep lubricants in and dirt out. This output rod 70 is further guided by crosshead 64A which in turn is guided by the case plates 32, 34 and 36. The output crosshead 64A has spaced extension plates 65 each of which has a slot 65A to receive respective slide blocks 66 which house the output eccentric bearings 82. The slide blocks 66 are slidably mounted in the slots 65A in the extension plates of crosshead 64A; these slots are shown with axes perpendicular to the axis of the output rod 70, but these slots may be inclined or even curved to achieve greater versatility as will be later explained in connection with FIG. 35. The output eccentric bearings 82 are driven by the output eccentrics 80 which are rigidly bolted to or integral with the gear 54 and the input eccentrics 50. The eccentricity of the eccentrics 80 from the true centerline of the gear 54 may be varied from 0 to slightly more than the pitch radius of the gear, as another of the parameters which controls the force and kinematic characteristics of the system.

The phase angle between the drive wheel in the form of a gear 54 radial lines on which the input eccentrics 50 and the output eccentrics 80 are respectively located may again be varied to modify the force and kinematic characteristics of the system, even though this angle is shown as 0 in the drawings.

As in FIGS. 1 to 7, a rack 38 is rigidly bolted to the lower case plate 32 and is suitably formed and located to mesh with the gear 54. The gear teeth are conventional and not shown. This rack will generally but not necessarily be slightly longer than one pitch circumference of the gear 54. The gear 54 is provided with shoulders 55 which operate in bearings 58 mounted in guide block 56. This guide block 56 in turn is also guided between the lower case plate 32 and the upper case plate 34 and maintains the pitch line of the gear 54 on the pitch line of the rack 38 during the rolling of the gear 54 along the rack 38.

This mechanism is defined to be operating in the slide mode because the eccentrics are connected to their respective crossheads through sliding members.

The mechanism may also be built in one of two hybrid modes: in one the input eccentrics are link connected to the input crosshead and the output eccentrics are slide connected to the output crosshead; in the other the input eccentrics are slide connected to their respective crosshead and the output eccentrics are link connected to the output crosshead.

A special but very important case occurs when the eccentricity of the input eccentrics 50 is 0, i.e., when the input eccentric bearings 52 are actually concentric with the gear 54. In this special case, the input rod is directly connected to the gear guide block 56, eliminating the input crosshead, input eccentrics and the associated link or slide connection systems.

Another special but less important case arises when the output eccentricity is zero, i.e., when the output eccentric bearings 82 are actually concentric with the gear 54. In this special case, the output rod 70 is directly connected to the gear guide block 56, eliminating the output crosshead, output eccentrics and the associated link or slide connection systems.

The sequence of movement can most easily be visualized by reference to three sets of sequential movement schematic sketches. In all sequences and in the subsequent kinematic analysis, certain defined symbols are used. The relevant variable quantities are:

$W$ = Input displacement (input rod movement) from initial position $U$ = Output displacement (output rod movement) from initial position $\theta$ = Angle through which gear has rotated from its initial position. The initial position of the gear is taken at that point where the radial line which contains the center of the output eccentrics is perpendicular to the rack at the point of pitch line tangency The relevant parameters which are fixed for any given mechanism but which may be varied from design to design are:

$R$ = Pitch radius of the gear which is taken as 1 for all analyses $R_1$ = Distance from the center of the gear to the center of the output eccentrics $R_2$ = Distance from the center of the gear to the center of the input eccentrics $u$ = Phase angle between the gear radial line which contains the center of the input eccentrics and the gear radial line which contains the center of the output eccentrics. It is defined as positive if the input eccentric radial line is leading the output eccentric radial line in the direction of gear rotation.

The qualitative sequence of movement in the slide mode (the embodiment in FIGS. 8 to 14) is shown in FIGS. 15 – 19. In this example, the distance $R_1 = 1$, the distance $R_2 = 0.25$, and $u = 0$.

FIG. 15 shows the position of the gear and eccentrics at the start of the motion. $W$, $U$ and $\theta$ are all equal to zero.

After the gear has been rotated through an angle of 90° by the input movement, the condition is as shown in FIG. 16. It will be seen that the input-distance moved, which is $W$, is considerably greater than the resultant output movement $U$, which has slowly accelerated from zero in this interval. It will be further seen that at this point, the velocities of $U$ and $W$ are equal since the projected distances from the instantaneous center of rotation of the gear (the pitch line tangency point) to the input and output eccentric centers are equal.

After the gear has been rotated through an angle of 180° by the input movement, the condition is as shown in FIG. 17. It will be seen that at this point the output distance moved, $U$, has caught up with and is equal to the input distance moved, $W$. It will be further seen that at this point the velocity of the output, $U$, is greater than the velocity of the input, $W$, because the distance from the output eccentric to the instantaneous center of rotation is greater than the distance from the center of the input eccentric to the instantaneous center of rotation. Therefore, the output has continued to accelerate up to this point.

After the gear has been rotated through an angle of 270° by the input movement, the condition is as shown in FIG. 18. It will be seen that at this point, the output distance moved, $U$ has become greater than the input distance moved, $W$, and that both are again increasing at the same rate. Therefore, the output has decelerated during the last interval, even though it has moved through a greater distance than the input.

Finally, after the gear has been rotated through an angle of 360° by the input movement, the condition is as shown in FIG. 19. At this point, the input $W$ and the output $U$ are again equal to each other and equal to the pitch circumference of the gear. The velocity of the output is zero since the center of the output eccentric is coincident with the instantaneous center of rotation. The output has continued to decelerate during the last interval.

The qualitative sequence of movement in the link mode (the embodiment of FIGS. 1 to 7) is shown in FIGS. 20 – 24. In this example the distance $R_1$ again equals 1, the distance $R_2$ again equals 0.25, and the phase angle $u$ again equals 0.

FIG. 20 shows the position of the gear and eccentrics at the start of motion. $W$, $U$, and $\theta$ are all equal to zero.

After the gear has been rotated through an angle of 90° by the input movement, the condition is as shown in FIG. 21. By comparing this with FIG. 16, which represents the slide mode mechanism after the same amount of gear rotation, it will be seen that the input $W$ of the link mode is less than the $W$ of the slide mode because of the slight increase in projected length of the input connector link. Similarly, the output $U$ of the link mode is slightly greater than the $U$ of the slide mode, again because of the slight increase in projected length of the output connector link.

After the gear has been rotated through an angle of 180° by the input movement, the condition is as shown in FIG. 22. Here $U$ and $W$ are equal to each other and equal to the $U$ and $W$ of the slide connected mode shown in FIG. 17, since the projected length of the input and output connector links are the same as they were at the beginning of the movement.

After the gear has been rotated through an angle of 270° by the input movement, the condition is as shown in FIG. 23. By again comparing this with the equivalent rotation situation of the slide mode as shown in FIG. 18, it will be seen that the output $U$ for the link mode is slightly greater than the output $U$ for the slide mode because of the increase of projected length of the output link, and for the same reason, the input $W$ for the link mode is slightly less than the input $W$ for the slide mode.

After the gear has been rotated through an angle of 360° by the input movement, the condition is as shown in FIG. 24. Here again, the input and output are equal to each other and equal to the pitch circumference of the gear.

By comparing the corresponding movement figures between the slide mode and link mode, it is clear that the displacement characteristics are identical at the 0°, 180°, and 360°. It is further clear that a slight variation exists at the 90° and 270° points and that this variation is dependent on both the eccentricity and link lengths. These variations in displacement and also in velocity and acceleration will be quantitatively determined below.

The qualitative sequence in the slide mode, but with a phase angle $u$ of 60° is shown in FIGS. 25–29. In this example the distance $R_1$ is again equal to 1, and the distance $R_2$ is again equal to 0.25.

FIG. 25 shows the position of the gear and the eccentrics at the start of motion. $W$, $U$ and $\theta$ are all equal to zero.

After the gear has been rotated through an angle of 90° by the input movement, the condition is as shown in FIG. 26. By comparing FIG. 26 with FIG. 16, it will be seen that the output movement $U$ is the same whether the phase angle is 0° or 60°. However, the input movement $W$ for the case of 60° phase angle $u$ is considerably greater than the input movement $W$ when the phase angle $u$ is 0°. Therefore, during this interval, the relative movement of output $U$ to input $W$ is less when the phase angle is 60° than when the phase angle is 0°.

After the gear has been rotated through an angle of 180° by the input movement, the condition is as shown in FIG. 27. The output $U$ is again equal to the output $U$ when the phase angle $u$ is zero as shown in FIG. 17. But the input $W$ when the phase angle is 60° as shown in FIG. 27 is still greater than the input $W$ when the phase angle is 0° as shown in FIG. 17.

After the gear has been rotated through an angle of 270° by the input movement, the condition is as shown in FIG. 28. The output movement $U$ has now become larger than the input movement $W$ but the difference is not as great as for the corresponding gear rotation when the phase angle is zero as shown in FIG. 18.

Finally, after the gear has been rotated through an angle of 360° by the input movement as shown in FIG. 29, the input $W$ and the output $U$ are again equal to each other and equal to the pitch circumference of the gear, as was the case in the other two examples.

This example indicates qualitatively, that with a positive phase angle $u$, the relative movement of the output compared to the input is less than when the phase angle is zero during the first half or so of the stroke and correspondingly greater during the last part of the stroke. These interrelationships will now be quantitatively determined.

With reference to the kinematic development, several specific terms require definition. In the accepted sense, velocity means the rate of change of displacement with respect to time and will be so used in this disclosure; similarly, acceleration means the rate of change of velocity with respect to time and also will be so used in this disclosure.

In the mechanism described herein, the velocity and acceleration characteristics of the output are dependent not only on the mechanism but also on the velocity and acceleration characteristics of the input. For most applications, the input will be moved at a nominally constant velocity, except for the extreme ends of the movement; therefore, the output velocity and acceleration characteristics will be calculated on the basis of an assumed constant velocity input. The term relative velocity is defined for the purposes of this disclosure as the velocity of the output assuming a constant input velocity; and the term relative acceleration is defined for the purposes of this disclosure as the acceleration of the output again assuming a constant input velocity.

If the input does not move at a constant velocity, transfer functions are stated which describe the output velocity as a function of the input velocity, and other transfer functions are stated which describe the output acceleration as functions of the input velocity and input acceleration.

The output displacement characteristics relative to the input displacement are, of course, unaffected by either the velocity or acceleration of the input.

In addition to the symbols previously introduced and defined, the following symbols are defined to determine the kinematic and force characteristics of the output:

$V_t$ = True velocity of the output = $(dU/dt)$
$V$ = Relative velocity of the output = $(dU/dW)$
$A_t$ = True acceleration of the output = $(d^2U/dt^2)$
$A$ = Relative acceleration of the output = $(d^2U/dW^2)$ In all of the kinematic relationship developments, the radius of the gear is taken as 1.

In this and all subsequent analyses, the displacement for both the input and output are most conveniently expressed in terms of $\theta$, which becomes a calculating parameter. Expressing the output $U$ in terms of the input $W$ is generally an extremely cumbersome procedure. Therefore, it is also far more convenient to differentiate with respect to $\theta$ as required to obtain the relative velocity and relative acceleration solutions. It can be shown for a general case, that if U is some function of $\theta$, $U = f(\theta)$, and $W$ is some other function of $\theta$, $W = g(\theta)$, then $(dU/dW)$ and $(d^2U/dW^2)$ can be expressed as derivatives with respect to $\theta$ as follows:

$$V = \frac{dU}{dW} = \frac{\frac{dU}{d\theta}}{\frac{dW}{d\theta}} \quad (1)$$

$$A = \frac{d^2U}{dW^2} = \frac{\frac{dW}{d\theta}\frac{d^2U}{d\theta^2} - \frac{dU}{d\theta}\frac{d^2W}{d\theta^2}}{\left(\frac{dW}{d\theta}\right)^3} \quad (2)$$

These relationships will be used repeatedly and will be referred to as equation 1, and equation 2, as parenthetically noted.

It will be noted that the quantity $(dW/d\theta)$ appears in the denominator of the expressions for both $v$ and $A$. Mathematically, this means that the expressions become indeterminate at points where $(dW/d\theta)$ becomes zero and such points must be avoided. Practically this means that a point of infinite mechanical disadvantage arises for the input and the mechanism will not move. Accordingly, such points will also be avoided.

Another valuable characteristic for investigation is the force ratio of output relative to input, i.e., the units of output force generated for each unit of input force. Assuming a negligible friction in the system, the force ratio is the reciprocal of the relative velocity. This is proven as follows:

Work in = Work out
$F_i$ = Input force
$F_o$ = Output force
$F_i \times dW = F_o \times dU$
$(F_o/F_i) = (dW/dU) = (1/V)$ All relative velocity graphs are therefore marked with a second scale indicating the force ratio of output to input.

Referring to FIG. 30, the diagram for a slide mode, in phase, straight rack system:

It can be seen that after the gear has been rotated by the input through an angle $\theta$ from an initial starting position in which the radius $R_1$ was perpendicular to the rack the following displacement relationships exist:

$$U = \theta - R_1 \sin \theta$$
$$W = \theta - R_2 \sin \theta$$

The starting position was so chosen for mathematical convenience. It need not be the starting point for the mechanism.

Differentiating the expressions for $U$ and $W$ with respect to $\theta$, we obtain:

$$(dU/d\theta) = 1 - R_1 \cos \theta$$
$$(dW/d\theta) = 1 - R_2 \cos \theta$$

Therefore, by substituting these expressions into equation (1), we obtain the following expression for relative velocity:

$$V = (dU/dW) = (1 - R_1 \cos \theta / 1 - R_2 \cos \theta)$$
(3)

By differentiating a second time with respect to $\theta$, the following relationships are obtained:

$$(d^2U/d\theta^2) = R_1 \sin \theta$$
$$(d^2W/d\theta^2) = R_2 \sin \theta$$

Substituting these expressions into equation (2), and algebraically simplifying, the following expression is obtained for the relative acceleration:

$$A = (d^2U/dW^2) = ((R_1 - R_2) \sin \theta / (1 - R_2 \cos \theta)^3)$$
(4)

Equations (3) and (4) express the relative velocity and acceleration of the output for a constant input velocity, with $\theta$ as a calculating parameter. For every arbitrary value of $\theta$, there is a corresponding value of $U$, $W$, $(dU/dW)$, and $(d^2U/dW^2)$. Therefore, for every value of $W$ so obtained, there is a corresponding value of $U$, $(dU/dW)$, and $(d^2U/dW^2)$. It is with these relationships that we are concerned. In other words, $\theta$ was used only as a mathematical convenience; and the output displacement, relative velocity, and relative acceleration will be shown in terms of the input position W.

The curves shown in FIGS. 36–41 represent the displacement, relative velocity, and relative acceleration characteristics of the output plotted against input position for the slide mode, in phase, straight rack design. The relative velocity and relative acceleration characteristics are predicated on the velocity of the input being constant. These curves are presented for illustrative purposes to demonstrate the extremely wide range of output characteristics which may be obtained with this single mechanism by the judicious choice of the parameters $R_1$ and $R_2$ only. Obviously, the total number of combinations is very large depending on the increments of difference, so only a representative cross section is shown.

Since the centers of the input and output eccentrics are on the same radial line, it will be clear that all characteristics are symmetrical about the midpoint of input movement, if the input movement causes one full rotation of the gear, i.e., 360°. The input curve scales are set up that one full revolution of the gear is equivalent to one unit of input movement. Therefore, all curves are drawn for only one-half the input stroke. The inner set of scales are read to determine the characteristics for the first half of the input stroke; the outer set of scales are read to determine the characteristics for the second half of the input stroke.

FIGS. 36, 37 and 38 represent the characteristics of the output motion for the special case of $R_1 = 1$, i.e., the centerline of the output eccentric is located on the pitch line of the gear. Curves are drawn for various values of $R_2$. It can be seen that a considerable change in the output motion characteristics can be accomplished by control of $R_2$ alone. When $R_2$ equals say 0.75 there is an initial high acceleration which tapers off to a nearly zero acceleration (approximate constant velocity) over the center of the stroke which in turn is followed by a symmetrically high short deceleration. If $R_2$ were made still larger, these characteristics would be accentuated, i.e., shorter higher initial acceleration and symmetrical deceleration with a longer center interval of more nearly constant velocity.

On the other hand, decreasing $R_2$, as can be noted for the curves $R_2 = 0.50$, and $R_2 = 0.25$, lowers and lengthens the initial acceleration and symmetrical deceleration and shortens and makes less uniform the center constant velocity section. At $R_2 = 0$, we have the special case of cycloidal acceleration.

As $R_2$ is made negative, the characteristics reverse; the initial acceleration is very low and becomes increasingly greater during the second quarter of the movement, then dropping sharply to zero at the exact midpoint and again a symmetrical deceleration on the other side of the midpoint. This causes a relatively high speed output movement at the center of the stroke. These effects become increasingly exaggerated as $R_2$ is made more negative. In fact, if $R_2$ were made equal to $-1$, an infinite relative velocity would be reached at the center of the stroke.

When $R_1 = 1$ (phase angle is zero) the initial acceleration and velocity of the output are always zero, and the final acceleration and velocity are zero, based on arbitrary starting and stopping point of the gear; the acceleration is always zero at the midpoint of motion; and the maximum velocity is reached at the midpoint of motion. Yet, within these limitations a wide change in the characteristics of the output motion can be made through control of the magnitude of $R_2$ alone.

The curves of FIGS. 39, 40 and 41 provide illustrative examples of the output motion characteristics when $R_1$ is not 1. As $R_1$ is made increasingly less than 1, the characteristics above described become less pronounced. The general effect of a change in $R_2$ remains the same, but with milder results. When $R_1 = R_2$ the trivial result is obtained that the output motion exactly equals the input motion. If $R_1$ is made less than $R_2$ a reversal of characteristics is found.

When $R_1$ is less than 1, the initial relative velocity is no longer zero but is equal to the ratio $(1 - R_1/1 - R_2)$. The motion characteristics of the output are still symmetrical about the midpoint, and zero acceleration is also again always reached at the midpoint. Furthermore, the velocity at the midpoint is a maximum if $R_1$ is greater than $R_2$ or a minimum if $R_1$ is less than $R_2$.

In the foregoing analysis, the centerlines of the output eccentric and the input eccentric were located on the same radial line or diametral line of the gear, i.e., the phase angle was zero. Still greater versatility is achieved by locating the centerline of the input eccentric on a different radial line of the gear than that on which the output eccentric is located. This angle is defined as the phase angle $u$ and is positive if the input radial line is leading the output radial line in the direction the gear is rotating.

Referring to FIG. 31, the kinematic diagram for a slide mode, out of phase, straight rack system, it can be seen that after the gear has been rotated by the input movement through an angle $\theta$ from its initial position in which the radius $R_1$ was perpendicular to the rack, the following displacement relationships exist:

$$U = \theta - R_1 \sin \theta$$

$$W = \theta - R_2 \sin(\theta + u) + R_2 \sin u$$

Differentiating with respect to $\theta$:

$$(dU/d\theta) = 1 - R_1 \cos \theta$$

$$(dW/d\theta) = 1 - R_2 \cos(\theta + u)$$

Substituting these expressions into the general equation (1):

$$(dU/dW) = [1 - R_1 \cos \theta / 1 - R_2 \cos(\theta + u)] \text{ (Relative Velocity)}$$

(5)

Differentiating again with respect to $\theta$:

$$(d^2U/d\theta^2) = R_1 \sin \theta$$

$$(d^2W/d\theta^2) = R_2 \sin(\theta + u)$$

Substituting these values into the general equation (2) and algebraically simplifying, the following relationship is obtained for the relative acceleration:

$$(d^2U/dW^2) = (R_1 \sin \theta - R_2 \sin(\theta + u) - R_1 R_2 \sin u / [1 - R_2 \cos(\theta + u)]^3)$$

(6)

Equations (5) and (6) represent the relative velocity and relative acceleration for a slide mode, out of phase, straight rack system, with $\theta$ again used as a calculating parameter. The effect of the phase angle, $u$, is illustrated in the representative curves of FIGS. 42, 43 and 44 in which the output displacement, output relative velocity, and output relative acceleration are plotted against the input displacement. A single illustrative combination of $R_1$ and $R_2$ is used which is $R_1 = 1$ and $R_2 = 0.50$.

It will be noted that when $u = 0°$, the curves are the same as those for the corresponding conditions in FIGS. 36, 37 and 38.

Furthermore, it will be noted that the curves for $u = 180°$ in FIGS. 42, 43 and 44 are exactly the same as those shown for $R_2 = 0.50$ ($u = 0$) in FIGS. 36, 37 and 38. This is to be expected since the effect of making $u = 180°$ from $u = 0$ is exactly the same as changing the sign of $R_2$.

The effect of intermediate values of $u$ may be understood by reference to FIGS. 42, 43 and 44. As $u$ is increased from 0, the initial acceleration is decreased and stretched out. The maximum velocity position (zero acceleration) is no longer reached at the midpoint of the movement but at some point beyond. Both the position and magnitude of the maximum velocity are clearly evident in FIG. 43.

A particularly interesting situation occurs when $u = 60°$. It will be seen that the acceleration is essentially constant after a short smooth rise at the very beginning of the stroke, and the velocity rises in nearly a true straight line for approximately eight-tenths of the input stroke. The acceleration then abruptly reverses and the velocity drops smoothly to 0 during the last two-tenths of the input stroke. In other words, the velocity profile is nearly a perfect "sawtooth" with rounded corners.

The effect of $u$ is comparable for other combinations of $R_1$ and $R_2$, though as $R_2$ is decreased, the effect of $u$ is diminished, and when $R_2$ becomes 0, $u$ obviously has no effect at all.

The parameter $u$ therefore is a means through which a reasonable degree of nonsymmetry can be introduced into the output motion characteristics of the system.

The use of the link mode rather than the slide mode is primarily for reasons of greater mechanical simplicity. The kinematic differences will now be examined.

Referring to FIG. 32, the kinematic diagram for the link mode, in phase, straight rack system, $R_1$ and $R_2$ are as shown in FIG. 30. The length of the input connector link is defined as $\alpha_2 R_2$, that is, this link is $\alpha_2$ times longer than the radius $R_2$. Similarly, the length of the output connector link is defined as $\alpha_1 R_1$. The use of these definitions makes both $\alpha_1$ and $\alpha_2$ dimensionless numbers and the subsequent analyses will have a more general application. By the Pythagorean theorem, the projected length of the input connector link on the line of action in its initial position is $(\alpha_2^2 R_2^2 - R_2^2)^{1/2}$ which equals $R_2(\alpha_2^2 - 1)^{1/2}$. The projected length of this link after the gear has been rotated through an angle $\theta$ is $(\alpha_2^2 R_2^2 - R_2 \cos^2\theta)^{1/2}$ which is more conveniently expressed $R_2(\alpha_2^2 - 1 + \sin^2\theta)^{1/2}$.

By applying the same techique to the projected length of the output link, the following expressions may be stated for the input and output displacements after the gear has been rotated through an angle $\theta$ from its initial position.

$$W = \theta + R_2(\alpha_2^2 - 1)^{1/2} - R_2 \sin\theta - R_2(\alpha_2^2 - 1 + \sin^2\theta)^{1/2}$$
$$U = \theta - R_1(\alpha_1^2 - 1)^{1/2} - R_1 \sin\theta + R_1(\alpha_1^2 - 1 + \sin^2\theta)^{1/2}$$

By differentiating both these expressions with respect to $\theta$, the following are obtained:

$$(dW/d\theta) = 1 - R_2 \cos\theta - R_2[\cos\theta \sin\theta/(\alpha_2^2 - 1 + \sin^2\theta)^{1/2}]$$
$$(dU/d\theta) = 1 - R_1 \cos\theta + R_1[\cos\theta \sin\theta/(\alpha_1^2 - 1 + \sin^2\theta)^{1/2}]$$

Substituting these expressions into equation (1), the following is obtained as the expression for relative velocity:

$$\frac{dU}{dW} = \frac{1 - R_1 \cos\theta + R_1 \dfrac{\sin\theta \cos\theta}{(\alpha_1^2 - 1 + \sin^2\theta)^{1/2}}}{1 - R_2 \cos\theta - R_2 \dfrac{\sin\theta \cos\theta}{(\alpha_2^2 - 1 + \sin^2\theta)^{1/2}}} \quad (7)$$

By differentiating again with respect to $\theta$, the following are obtained:

$$(d^2U/d\theta^2) = R_1 \sin\theta + R_1[(\alpha_1^2 - 1)(1 - 2\sin^2\theta) - \sin^4\theta/(\alpha_1^2 - 1 + \sin^2\theta)^{3/2}]$$

$$(d^2W/d\theta^2) = R_2 \sin\theta - R_2[(\alpha_2^2 - 1)(1 - 2\sin^2\theta) - \sin^4\theta/(\alpha_2^2 - 1 + \sin^2\theta)^{3/2}]$$

These expressions, and the respective first derivatives of $U$ and $W$ with respect to $\theta$, may be substituted into equation (2), but the resultant algebraic expression becomes so cumbersome that it is more convenient to accomplish the specific calculations by evaluating each derivative independently and then substituting their values into equation (2) to obtain the relative acceleration. This technique is even more acceptable because it is ordinarily desired to evaluate the $\theta$ derivatives independently in any case. For simplification of these operations, equation (2) may be rewritten:

$$(d^2U/dW^2) = [d^2U/d\theta^2/(dW/d\theta)^2] - [dU/d\theta \cdot d^2W/d\theta^2/(dW/d\theta)^3]$$

(2A)

In this and all subsequent variations, only the relative velocity curves will be presented, since these curves may be interpreted to indicate the displacement and relative acceleration information in a comparative sense. It will be understood that the area under the relative velocity curve up to a given point is a measure of the displacement up to that point, and that the slope of the relative velocity curve at any point is a measure of the relative acceleration at that point. Judicious examination of the relative velocity curves reveals both displacement and relative acceleration information. The curves for the in-phase link mode system are included with those of the link mode out-of-phase system described below.

Referring to FIG. 33, the kinematic diagram for the link mode, out-of phase, straight rack system, $R_1$ and $R_2$ are again as shown in FIG. 31. By applying the same techniques of link projection previously described, the following expressions may be stated for the input and output displacements after the gear has been rotated through an angle $\theta$ from its initial position:

$$W = \theta + R_2(\alpha_2^2 - 1 + \sin^2 u)^{1/2} - R_2 \sin(\theta + u) - R_2(\alpha_2^2 - 1 + \sin^2(\theta + u))^{1/2}$$
$$U = \theta - R_1(\alpha_1^2 - 1)^{1/2} - R_1 \sin\theta + R_1(\alpha_1^2 - 1 + \sin^2\theta)^{1/2}$$

By differentiating both these expressions with respect to $\theta$, the following are obtained:

$$(dW/d\theta) = 1 - R_2 \cos(\theta + u) - R_2(\sin(\theta + u) \cos(\theta + u)/[\alpha_2^2 - 1 + \sin^2(\theta + u)]^{1/2})$$
$$(dU/d\theta) = 1 - R_1 \cos\theta + R_1[\sin\theta \cos\theta/(\alpha_1^2 - 1 + \sin^2\theta)^{1/2}]$$

lowing expressions may be written for the input and output displacements:

$W = (N-1) \sin(180/N) + R_2 \sin((180/N) + u) - [(N-1)\sin(180-\theta/N) + R_2 \sin(\theta + (180-\theta/N) + u)]$ $U = (N - 1 + R_1) \sin(180/N) - [(N - 1) \sin(180-\theta/N) + R_1 \sin(\theta + (180- \theta/N))]$ Differentiating both these expressions with respect to $\theta$, the following are obtained:

$(dW/d\theta) = (1 - (1/N)) [\cos(180-\theta/N) - R_2 \cos(\theta + 180-\theta/N + u)]$ $(dU/d\theta) = (1 - (1/N)) [\cos(180-\theta/N) - R_1 \cos(\theta + (180-\theta/N)]$ Substituting these expressions into equation (1), the following expression is obtained for relative velocity:

$$\frac{du}{dW} = \frac{\cos\left(\frac{180-\theta}{N}\right) - R_1 \cos\left(\theta + \frac{180-\theta}{N}\right)}{\cos\left(\frac{180-\theta}{N}\right) - R_2 \cos\left(\theta + \frac{180-\theta}{N} + u\right)} \quad (9)$$

To obtain the expression for the relative velocity in the in-phase condition, it is only necessary to set $u = 0$ in the above expression.

By differentiating again with respect to $\theta$, the following expressions are obtained:

$$\frac{d^2W}{d\theta_2} = \left(1 - \frac{1}{N}\right)\left[\frac{1}{N} \sin\left(\frac{180-\theta}{N}\right) + \left(1 - \frac{1}{N}\right) R_2 \sin\left(\theta + \frac{180-\theta}{N} + u\right)\right]$$

$$\frac{d^2U}{d\theta^2} = \left(1 - \frac{1}{N}\right)\left[\frac{1}{N} \sin\left(\frac{180-\theta}{N}\right) + \left(1 - \frac{1}{N}\right) R_1 \sin\left(\theta + \frac{180-\theta}{N}\right)\right]$$

In this instance, it is again more convenient to determine the relative acceleration by separately evaluating the first and second derivatives of $U$ and $W$ with respect to $\theta$ according to the above expressions at each point of interest, and then inserting their values into equation (2) or (2A) to obtain the relative acceleration at that point.

It is again relevant to determine the null point conditions for comparative purposes. It is found that the null point characteristics are dependent only on the parameter $N$. In an illustrative example the conditions for the null point when $N = 6$ are: $R_1 = 0.800$ and $\theta_N = -46.56$. As $N$ is decreased, $R_1$ also decreases and $\theta_N$ becomes more negative.

For the example of $N = 6$ and $R_1 = 0.800$, it can be seen that the reduction of $R_1$ to 0.800 from $R_1 = 1$ for the straight rack system null point condition, that the resultant deviation of the center of the output eccentric from the line of action becomes still less.

For this condition of $N = 6$ and $R_1 = 0.800$ for the slide mode in phase curved rack system, the curves for the relative velocity are shown in FIG. 47. By comparing these curves with those shown in FIG. 37 for identical values of $R_2$, it will be seen that the general characteristics are comparable, that the effect of $R_2$ is generally the same, except that with the curved rack, the velocity rises slightly faster near the start of the stroke and peaks at a slightly lower value near the midstroke than under the comparable conditions using a straight rack.

Another important and useful variation is a slide mode system in which the slots in the input and/or output crossheads are straight but not perpendicular to their direction of movement. The kinematic diagram for the analysis of this system is shown in FIG. 35. To anaylze this inclined slide mode system, two new variables require definition:

$K_1$ = slope of output slot from the perpendicular to the line of action = $(x_1/y_1)$ $K_2$ = slope of input slot from the perpendicular to the line of action = $(x_2 y_2)$ The analysis will again only be made for the out-of-phase system since the results for the in-phase system can be obtained by setting $u = 0$, in the out-of-phase results.

Referring to FIG. 35, it can be seen that the input and output displacements, after the gear has been rotated through an angle $\theta$ from its initial position, are as follows:

$U = \theta - R_1 \sin \theta + K_1 R_1 (1 - \cos \theta)$ $W = \theta - R_2 \sin(\theta + u) + R_2 \sin u + K_2 R_2 [\cos u - \cos(\theta + u)]$ The mathematical techniques for obtaining the relative velocity and acceleration are identical with those previously carried out in the other systems. Through solving for the null point, it was found that the kinematic characteristics of the inclined slot system were identical with those for the perpendicular slot slide mode system with a change in parameters. This is proved as follows:

A new equivalent radius, $R_e$ and compensating gear angle $\theta_k$, both of which are constants, are defined as follows:

$R_e = (R_1/\cos \theta_k)$ $\theta_k = \arctan(-K_1)$

Therefore:

$R_1 = R_e \cos \theta_k$ $K_1 = -\tan \theta_k = -(\sin \theta_k/\cos \theta_k)$ Substituting these values for $R_1$ and $K_1$ into the expression for $U$ above, the following is obtained:

$U = \theta - R_e \cos \theta_k \sin \theta - (\sin \theta_k/\cos \theta_k) R_e \cos \theta_k (1 - \cos \theta)$ $U = \theta - R_e \cos \theta_k \sin \theta - R_e \sin \theta_k + R_e \sin \theta_k \cos \theta$ $U = \theta - R_e \sin \theta_k - R_e (\sin \theta \cos \theta_k - \cos \theta \sin \theta_k)$ $U = \theta - R_e \sin \theta_k - R_e \sin(\theta - \theta_k)$ An equivalent gear angle $\theta_e$ is now defined as follows:

$\theta_e = \theta - \theta_k$

Therefore:

$U = \theta_e + \theta_k - R_e \sin \theta_k - R_e \sin \theta_e$ $U = \theta_e - R_e \sin \theta_e + (\theta_k - R_e \sin \theta_k)$ The entire expression in the parenthesis is a constant quantity and disappears in differentiation; practically, it expresses a shift in displacement. The derivatives of $U$ with respect to $\theta_e$ will be identical with those of the conventional slide mode system in which $R_1$ is replaced by $R_e$ and $\theta$ is replaced by $\theta_e$.

This same procedure can be repeated with regard to $W$ to prove kinematic equivalence through the introduction of new variables.

This means that the kinematics of motion of the inclined slide system are identical with those of a conventional (perpendicular) slide mode system provided that in the inclined slide mode the radius of the output eccentric is reduced by the factor $\cos \theta_k$ from the equivalent radius of the equivalent conventional slide mode system.

It will be seen that the radius for the inclined slide system will always be less than the radius of the equivalent conventional slide mode system since the cosine is always less than 1, if $\theta_k$ has a non zero value. Therefore, the amount of eccentricity for the inclined slide system is less than that of the conventional slide system. This is a considerable mechanical advantage since the lengths of the slots in the crossheads are decreased, the gear eccentrics require less "throw" and are consequently stiffer, and less overall space is required.

The same equivalence applies to the input system, when the appropriate compensations are made for the inclined slots.

Another kinematic variation of importance is one in which the slots in the input crosshead, or output crosshead, or both, are curved or contoured as opposed to being straight, either inclined or perpendicular, as in the previous analyses. Such contouring of the crosshead slots mechanically requires that the slide blocks be replaced by rollers to follow the non-uniform slot path. Such contouring, individually tailored to meet a specific requirement, creates a still greater flexibility between the input and output. An example where this technique is of value is in a situation in which it is desired to generate an output dwell, at each end of the stroke, which is greater than any obtainable with any of the other systems.

Within any of the kinematic arrangements or combinations, other additional modifications may be employed. In each of the drawings so far described, the input and the output rods were colinear, and, in the straight rack design, the line of action passed through the center of the gear; in the curved rack design, the line of action passed near the average position of the output eccentric. It is also possible to have the input and output rods non-colinear, or to bring their lines of action closer to the racks so that the line of force transmittal is more nearly a straight line when the loads are the greatest, i.e., when the output eccentrics are nearest to the rack. Furthermore, the input and output rod need not be parallel to each other or to the plane of the rack.

In each of the drawings so far described, the input and output rods were located on opposite sides of the travelling gear. It is also possible to locate the input and output rods on the same side of the gear, either side by side, one above the other, or in a coaxial arrangement, i.e., one of the two rods in a hollow tube, with the other rod slidably mounted therein.

Another variation is the gear eccentric assembly. In all examples previously shown, the gear was symmetrically flanked by the input and output eccentrics respectively, which is a mechanically convenient arrangement. In another arrangement, a single output eccentric in the center of the assembly is flanked by the input eccentrics, the two gears and the gear guide bearings. This style is particularly attractive for the integral piston approach since it fits very conveniently into a circular section housing as opposed to a rectangular section housing or frame.

Such a design is shown in section in FIG. 48 which is analogous to the sections in FIGS. 6 and 13. Referring to FIG. 48, the housing 90 has connected to it two racks 92. Two identical gears 94 are suitably formed and guided to mesh with the racks 92. The gears 94 are bolted to or made integral with two input eccentrics 96 which in turn are bolted to or made integral with an output eccentric 98. Each gear 94 supports a short shaft extension 104 concentric therewith which are guided in bearings 106 mounted in guide block 108.

The input crosshead, not shown, is connected to the input eccentrics 96 through connector links 110 and bearings 112. Similarly, the output crosshead, not shown, is connected to the output eccentric 98 through connector link 100 and bearing 102.

This design shown in FIG. 48 employs the link mode; a similar design is usable with the slide mode or hybrid modes.

Other kinematic variations which may be usefully employed include multiple side-by-side gears having a point of mutual tangency which mesh with multiple corresponding side-by-side racks that overlap slightly at a crossover point where the gear tangency point becomes mutually tangent to both racks. This in effect creates a system which depends on one gear and rack system for a portion of the stroke and on the other gear and rack system for the remainder of the stroke. The same type of effect can be achieved by making the gear non-circular and having it mesh with a straight, curved, or non-circular rack.

Since this is in essence a three-element system consisting of input member, output member and reaction member, it is possible to apply it mechanically such that the case is utilized as the input member, while the "input" rod is utilized as the reaction member. For this configuration, new sets of characteristic curves are required, but these may be derived using the same mathematical techniques as described herein.

All kinematic analyses of the output movements were made on the assumption that the input velocity was a constant. If the input velocity is not a constant, the output characteristics may be calculated according to these relationships:

$$V_o = VV_i$$
$$A_o = V_i^2 A + V A_i$$

where:
$A$ = Relative acceleration = $(d^2U/dW^2)$
$V$ = Relative velocity = $(dU/dW)$
$A_i$ = Acceleration of input member
$V_i$ = Velocity of input member
$A_o$ = Acceleration of output member
$V_o$ = Velocity of output member In the application for which the widest usage is foreseen, i.e., where the relative velocity reaches zero or near zero at each end of the stroke, the mechanical advantage of the input relative to the output approaches infinity at the ends of the stroke; and the mechanical advantage of the output relative to the input approaches zero and the output is locked. This lock is practically limited by the strengths of the teeth on the gear and the rack. Where large forces may be applied to the output at the ends of its stroke, as in holding applications, additional locking capacity may be added to the system by utilizing the inherent transverse movement component of the output eccentric to engage an auxiliary locking pawl, pin, or equivalent between the output crosshead and the case. In the case of the link mode systems, the output links themselves may be designed to come to rest against a suitably formed heel block to provide additional lock capacity.

In applications where the input member velocity is not otherwise regulated, as in the instance that it is driven by an air cylinder, and it is desired that this input velocity be regulated, the input crosshead may be fitted closely to the case, transforming it into an effective piston as it moves through the case. If the case is nearly filled with a suitable lubricating oil, the crosshead will perform the function of a speed regulator, which may be made adjustable by adding a variable bypass.

Where a small amount of leakage may be tolerated, the input rod may be eliminated completely, and the input crosshead used as a piston driven by fluid introduced through suitable ports at each end of the enclosed case.

Electrical limit switches may be added to be operated by the input system as a means to determine when the output is at one end of the stroke or the other. This arrangement is advantageous because of the much greater resolution this makes possible.

As can be seen from the equations and curves presented herein, the kinematic characteristics of this family of mechanisms can be varied over an extremely wide range. Some areas of operation are of greater practical significance than others.

One set of points of particular interest are those at which the output relative velocity is zero. At such a point $(dU/dW) = 0$. Therefore, $[(dU/d\theta)/(dW/d\theta)] = 0$, and $(dU/d\theta)$ must equal 0 if $(dW/d\theta)$ is finite. Each point of zero output velocity is therefore a function only of the output mechanism geometry. The input mechanism geometry will effect only the rate at which the output velocity passes through the zero point, but will not effect the position of this zero point.

There are two variations of this particular operating point at which the output velocity reaches zero; these are: the relative acceleration of the output is not simultaneously zero; or, the relative acceleration of the output is simultaneously zero.

Considering first the operating point where the relative acceleration is not simultaneously zero, the following generalizations can be made:

1. The relative velocity curve has a finite slope (equal to the acceleration) and in passing through zero must change sign. This means that the displacement curve reaches either a maximum or a minimum (not a point of inflection) and that an overshoot of the input beyond this point causes reversal of the output.

2. Since the relative acceleration of the output is not zero at the zero point for relative velocity, the relative velocity changes faster at each side of its zero point than if the relative acceleration were also zero. Therefore, the displacement also changes faster, meaning the output dwell is less than it would be if the relative acceleration were also zero at this point.

3. At a point of zero output relative velocity, the mechanical advantage of the input relative to the output reaches theoretical infinity, and this is true whether or not the relative acceleration is simultaneously zero.

4. At a point of zero output relative velocity, the mechanical advantage of the output relative to the input reaches zero. This means that the output is effectively locked within the physical capacity of the components and any load applied to the output rod is transmitted entirely to the case and none to the input rod.

At an operating point where the relative velocity and relative acceleration are simultaneously zero:

1. The relative velocity curve has 0 slope and reaches a maximum or minimum at a tangency point to the horizontal axis. At this point, the displacement curve has a horizontal point of inflection. Therefore, any overtravel of the input causes the output to move in the same direction it had been moving, i.e., there is no reversal.

2. The dwell of the output is a maximum as described above.

I claim:

1. A mechanical system for transferring and modifying motion from a lineal input to a lineal output which comprises:
   a. a drive wheel,
   b. means for movably mounting said drive wheel to permit confined translatory motion in a path normal to the axis of said wheel,
   c. means along said path associated with the periphery of said drive wheel wherein motion of said wheel along said path imparts a rotation to said wheel,
   d. lineal input means connected to a first off-center point on said wheel to drive said wheel in non-uniform rotation along said path, and
   e. lineal output means connected to a second off-center point of said wheel wherein rotation of said wheel adds vectorially, the motion of said wheel along said first means and the distance of said second off-center point from the center of said wheel in the direction of the input motion.

2. A mechanical system as defined in claim 1 in which said drive wheel is a gear and said first means is a rack and said lineal input includes a push rod input member, an input link pivotally associated at one end to said push rod and at the other end to said wheel at said first off-center point, an output rod, and an output link pivotally associated at one end with said wheel at said second off-center point and at the other end with said output rod.

3. A mechanical system as defined in claim 1 in which said lineal input includes a push rod input member, an input link pivotally associated at one end to said push rod, and at the other end to said wheel at said first off-center point, an output rod, and an output link pivotally associated at one end with said wheel at said second off-center point and at the other end with said output rod.

4. A mechanical system as defined in claim 1 in which said lineal input means includes a first crosshead, said lineal output means includes a second crosshead, means for guiding said crossheads to move in a defined path, a slide block in each of said crossheads mounted to move in a direction substantially transverse of said defined path, and means rotatably connecting said slide blocks with said drive wheel wherein input force on said first crosshead will move said wheel and said second crosshead.

5. A mechanical system as defined in claim 1 in which said lineal input means comprises an input rod, a first pair of spaced links pivotally connected at one end to said rod and having holes at the other end, a round projection on each side of said wheel interfitting with a hole in each of said links to have a rotating fit, and in which said lineal output means comprises an output rod, a second pair of spaced links pivotally connected at one end to said output rod and having holes at the other end, a second round projection on each of said first round projections positioned at the said off-center point relative to said drive wheel, said second round projections rotatably interfitting with said holes in said second pair of links.

6. A mechanical system as defined in claim 5 in which a housing means is provided to confine the movement of the pivoted ends of said links in a defined path colinear with the path of said wheel along said means.

7. A mechanical system for transferring motion which comprises: a. a housing defining an elongate chamber, b. an input rod movable into and out of one end of said housing and an output rod movable into and out of the other end of said housing,
 c. a crosshead connected to each of said rods, each crosshead being slidable in said housing and each having a pair of parallel plate extensions extending toward each other and spaced to interfit with each other, each of said plate extensions having a slot extending at an angle to the general direction of the said housing chamber,
 d. slide plates in each of said slots having round holes therein,
 e. a rack in said housing extending in the direction of said chamber along one side of said housing,
 f. a gear in said housing positioned between said extension plates engaging said rack, and
 g. round projections on the sides of said gear positioned on spaced centers and respectively interfitting rotatably with said holes in said respective pairs of slide plates wherein movement of said input rod will roll said gear along said rack and cause said output shaft to move as the vectorial sum of the movement of said centers of said projections and the center of said gear.

8. A mechanical system for transferring motion which comprises:
 a. a housing defining an elongate chamber,
 b. an input rod movable into and out of one end of said housing and an output rod movable into and out of the other end of said housing,
 c. a crosshead connected to each of said rods, each crosshead being slidable in said housing and each having a pair of parallel plate extensions extending toward each other and spaced to interfit with each other, each of said plate extensions having a slot extending at an angle to the general direction of the said housing chamber,
 d. follower means to move in and guided by each of said slots,
 e. a rack in said housing extending in the direction of said chamber along one side of said housing,
 f. a gear in said housing positioned between said extension plates engaging said rack, and
 g. means connecting the respective follower means on said respective extensions in pivotal association with said gear at spaced center points on said side gear wherein movement of said input rod will roll said gear along said rack and cause said output shaft to move as the vectorial sum of the movement of said center points and the center of said gear.

9. A linear motion transforming system having highly flexible kinematic characteristics from input to output comprising:
 a. a support member,
 b. an input member mounted for lineal motion in said support member,
 c. an output member mounted for lineal motion in said support member,
 d. an intermediate means connecting said input member to said output member comprising:
  1. a stationary reaction member mounted to said support member,
  2. a slide frame slidably mounted in said support member movable in substantially the same direction as said input and said output members,
  3. a rolling member confined in said slide frame movable in translation and rotation along said stationary reaction member,
  4. an output shaft arranged to revolve with said rolling member, with the axis of said output shaft parallel to, but displaced from, the axis of said rolling member,
  5. means connecting said output member to said output shaft,
  6. an input shaft arranged to revolve with said rolling member, with the axis of said input shaft parallel to but displaced from the axis of said rolling member, and
  7. means connecting said input member to said input shaft.

10. A motion transforming system as defined in claim 9 in which said means connecting said output member to said output shaft and said input member to said input shaft comprise respective link means pivoted at one point to said respective shafts and at another point to said respective members.

11. A linear motion transforming system having highly flexible kinematic characteristics from input to output comprising:
 a. a support member,
 b. an input member mounted for lineal motion in said support member,
 c. an output member mounted for lineal motion in said support member,
 d. an intermediate means connecting said input member to said output member comprising:
  1. a stationary reaction member mounted to said support member,
  2. a slide frame slidably mounted in said support member movable in substantially the same direction as said input and said output members,
  3. a rolling member confined in said slide frame movable in translation and rotation along said stationary reaction member,
  4. an output shaft arranged to revolve with said rolling member, with the axis of said output shaft parallel to, but displaced from, the axis of said rolling member,
  5. means connecting said output member to said output shaft,
  6. an input shaft arranged to revolve with said rolling member, with the axis of said input shaft parallel to but displaced from the axis of said rolling member,
  7. means connecting said input member to said input shaft,
  8. said means connecting said output member to said output shaft and said input member to said input shaft comprising follower means movable in a confined path generally transverse of said lineal motion in said respective input and output members, and
  9. means in each said follower means to receive, respectively, in rotatable relation, said input and output shafts.

12. A linear motion transforming system having highly flexible kinematic characteristics from input to output comprising:
   a. a support member,
   b. an input member mounted for lineal motion in said support member,
   c. an output member mounted for lineal motion in said support member,
   d. an intermediate means connecting said input member to said output member comprising:
      1. a stationary reaction member mounted to said support member,
      2. a slide frame slidably mounted in said support member movable in substantially the same direction as said input and said output members,
      3. a rolling member confined in said slide frame movable in translation and rotation along said stationary reaction member,
      4. an output shaft arranged to revolve with said rolling member, with the axis of said output shaft parallel to, but displaced from, the axis of said rolling member,
      5. means connecting said output member to said output shaft,
      6. an input shaft arranged to revolve with said rolling member, with the axis of said input shaft parallel to but displaced from the axis of said rolling member,
      7. means connecting said input member to said input shaft,
      8. said means connecting said output member to said output shaft and said input member to said shaft comprising extension plates on each said output and input members extending toward each other in overlapping relation each overlying said rolling member, said plates having slide slots extending generally transversely to said path of motion,
      9. follower means in said respective slide slots, and
      10. means in said follower means to receive said respective output and input shafts in rotatable relation.

13. A motion transferring system as defined in claim 12 in which one or more of said slide slots are angled to said path of motion.

* * * * *